United States Patent [19]

Oigo et al.

[11] Patent Number: 4,765,808
[45] Date of Patent: Aug. 23, 1988

[54] SEPARATION OF CARBON MONOXIDE FROM NITROGEN WITH BA EXCHANGED ZEOLITE X

[75] Inventors: Ei Oigo; Yoshitaka Noguchi, both of Tokyo, Japan

[73] Assignee: Union Showa Kabushiki Kaisha, Tokyo, Japan

[21] Appl. No.: 101,926

[22] Filed: Sep. 28, 1987

Related U.S. Application Data

[63] Continuation of Ser. No. 936,412, Dec. 1, 1986, abandoned, which is a continuation of Ser. No. 706,695, Feb. 28, 1985, abandoned.

[30] Foreign Application Priority Data

Feb. 28, 1984 [JP] Japan .................................. 59-35266

[51] Int. Cl.$^4$ ...................... B01D 53/14; B01D 53/02; B01D 53/34
[52] U.S. Cl. ........................................ 55/68; 55/75; 423/219; 423/247; 423/331
[58] Field of Search ................ 423/219, 230, 326, 327, 423/328, 329, 331, 332, 246, 247; 502/79, 73; 55/75, 68

[56] References Cited

U.S. PATENT DOCUMENTS

| | | | |
|---|---|---|---|
| 2,882,244 | 4/1959 | Milton | 423/328 |
| 3,013,989 | 12/1981 | Freeman | 502/79 |
| 3,078,635 | 2/1963 | Milton | 55/35 |
| 3,078,639 | 2/1963 | Milton | 55/35 |
| 3,140,932 | 7/1964 | McKee | 55/68 |
| 3,140,933 | 7/1964 | McKee | 55/68 |
| 3,280,536 | 10/1966 | Berlin | 55/68 |
| 3,885,927 | 5/1975 | Shekman et al. | 55/68 |
| 3,969,276 | 7/1976 | Rosback | 423/328 |
| 4,069,172 | 1/1978 | Kanaoka et al. | 502/79 |
| 4,394,178 | 7/1983 | Chao et al. | 502/79 |
| 4,477,267 | 10/1984 | Reiss | 55/68 |
| 4,481,018 | 11/1984 | Coe et al. | 55/68 |

OTHER PUBLICATIONS

Breck, Donald, Zeolite Molecular Sieves, John Wiley & Sons, NY, NY, 1974, pp. 645–655.

Primary Examiner—Gary P. Straub
Attorney, Agent, or Firm—Sughrue, Mion, Zinn, Macpeak & Seas

[57] ABSTRACT

A crystalline zeolite having, except for water crystallization, the formula:

$$Ba_{43x}Na_{86(1-x)}[(AlO_2)_{86}(SiO_2)_{104}] \qquad (I)$$

wherein x is a number from 0.6 to 0.8. This crystalline zeolite can be mixed with a binder, followed by the calcination. Thus, a zeolitic molecular sieve agglomerate suitable for use in the separation and/or removal of a specific component (e.g., carbon monoxide, oxygen, carbon dioxide, or water vapor) from a fluid stream containing the same.

7 Claims, 6 Drawing Sheets

SEPARATION OF CARBON MONOXIDE FROM NITROGEN WITH BA EXCHANGED ZEOLITE X

This is a continuation, of application Ser. No. 936,412, filed 12/1/86 now abandoned, which is a continuation of application Ser. No. 706,695 filed 2/28/85 now abandoned.

BACKGROUND OF THE INVENTION

1. Field of the Invention

The present invention relates to a crystalline zeolite, more specifically a barium-exchanged crystalline zeolite X (or a barium cation form type-X crystalline zeolite). The present invention also relates to an agglomerate comprising the above-mentioned crystalline zeolite and a binder material, which is suitable for use as an adsorbent for selective removal and/or separation of a specific component such as carbon monoxide, oxygen, carbon dioxide, and water vapor from a fluid stream containing the same.

2. Description of Related Art

It is well known in the art that natural or synthetic zeolites are industrially utilized for drying, purification, recovery, and/or separation of various fluids such as hydrocarbon streams and atmospheric air employing the adsorptive properties of the components in the fluids on the zeolites. The effectiveness of the treatments of a fluid stream such as drying, purification, recovery and/or separation depends upon the type of zeolite to be used as well as the components of a fluid to be treated. For example, Na-A zeolite (or sodium cation form type-A crystalline zeolite) pellets comprising crystalline zeolite Na-A and a clay mineral as main constituents can adsorb molecules having size and shape to permit entrance through a micro-pore of 3.8 angstroms such as water vapor, hydrogen sulphide, carbon dioxide, ethane, ethyl alcohol and butadiene, while other molecules such as porpane, cyclic hydrocarbons and compressor oil being excluded. The Na-A zeolite pellets, therefore, have been advantageously utilized as an adosrbent for such as natural gas and solvent drying, carbon dioxde removal from natural gas streams. Furthermore, Na-X zeolite pellets comprising crystals of Na-X zeolite having rational formula of:

Na$_{86}$[(AlO$_2$ $_{86}$(SiO$_2$)$_{106}$]·276H$_2$O and a clay mineral as main constituents can adsorb molecules smaller than an effective diameter of 10 angstroms such as iso-paraffins, iso-olefins and di-n-butylamine and exclude molecules having a large diameter of more than 10 angstroms such as tri-n-butylamine, and have been employed for the purposes of for example, simultaneous removal of moisture and carbon dioxide from fluid streams containing the same or the removal of sulphur compounds from hydrocarbon streams containing the same.

It is also known in the art that the entire or partial exchange of the cation in a crystalline zeolite to another has a marked effect on its adsorptivity and cation-exchanged forms of Na-form zeolites such as calcium- and potassium-forms are used depending upon services therewith. Barium-exchanged form zeolites, however, have not been of wide prevalence in industrial services, although some of the said forms have been proposed. For example, barium form zeolite X prepared by exchanging 90% or more of sodium cation in the above-mentioned zeolite Na-X with corresponding barium is described in, for example, U.S. Pat. No. 2,882,244. The Ba-form zeolite X exhibits the desirable separation property of various sorbates such as nitrogen and oxygen. However, the desirable separation property of the conventional barium-form zeolite X is susceptible to be impaired during processing, i.e., the blending of the barium-form zeolite and the binder, the fashioning of the mixture into suitable forms and the firing of the formed material at elevated temperatures has prevented the prevalence thereof in the practical use.

One the other hand, although the above-mentioned Na-X zeolite has been employed for the above-mentioned purpose, for example, as an industrial adsorbent for separation and/or removal, it is still not satisfactory for some uses as an adsorbent, for example, the separation of carbon monoxide and nitrogen and the separation of oxygen and nitrogen of atmospheric air.

SUMMARY OF THE INVENTION

Accordingly, the object of the present invention is to eliminate the above-mentioned disadvantages of the conventional Na-X zeolite and to provide a barium-exchanged crystalline zeolite X.

Another object of the present invention is to provide a zeolitic molecular sieve agglomerate for the use of effective separation and/or removal of specific components from fluid streams containing the same.

Other objects and advantages of the present invention will be apparent from the following descriptions.

In accordance with the present invention, there is provided a crystalline zeolite having, except for water of crystallization, the formula:

Ba$_{43x}$Na$_{86(1-x)}$[(AlO$_2$)$_{86}$(SiO$_2$)$_{106}$]  (I)

wherein x is a number from 0.6 to 0.8.

In accordance with the present invention, there is also provided a zeolitic molecular sieve agglomerate comprising a bonded product of a crystalline zeolite having the above-mentioned formula (I) and a binder activated at elevated temperature for the use of separation and/or removal of a specific component from a fluid stream containing the same.

BRIEF DESCRIPTION OF THE DRAWINGS

The present invention will be better understood from the following descriptions presented in connection with the accompanying drawings, in which.

DESCRIPTION OF THE PREFERRED EMBODIMENTS

As mentioned above, the crystalline zeolites according to the present invention are those having, except for the water of crystallization, the general formula (I) and obtained by substituting barium cation for 60% to 80% of the sodium cation of the Na-X zeolite. When the barium cation exchange ratio is less than 60%, the separation property of the sorbates in a fluid streams containing the same is not improved, when the agglomerates prepared by blending the zeolite and a clay binder and activated at elevated temperatures are compared with the conventional Na-X zeolite agglomerates prepared by the same procedure as the above-mentioned Ba-X zeolite agglomerates. Contrary to this, the Ba-X having higher than 80% of cation exchange ratio causes a difficulty in crystalline stability thereof, when manufactured into agglomerates for the industrial use with maintaining the desired adsorptive and/or separation property.

The Na-X zeolite used as a starting material in the preparation of the barium-exchanged crystalline zeolite X according to the present invention is known and commercially available, which can also be prepared by the methods disclosed in, for example, U.S. Pat. No. 2,882, 244 and 2,979,381.

The partial barium ion exchange of the Na-X zeolite can be carried out by, for example, a method disclosed in U.S. Pat. No. 2,882,244. For example, the Na-X zeolite is treated with a solution containing a certain amount of barium cation, such as an aqueous or alcoholic solution containing a certain amount of a barium compound to obtain the desired barium-exchanged crystalline zeolite X. A 0.1 to 1 mole/liter solution of barium chloride or barium nitrate can be typically employed in the preparation of the desired barium-exchanged crystalline zeolite X. The desired barium ion exchange ratio of 60% to 80% can be easily achieved by controlling the relative amounts of the barium compound and the Na-X zeolite used in the treatment process.

The barium-exchanged crystalline zeolite having the above-mentioned general formula (I) thus prepared can be advantageously converted into a zeolitic molecular sieve agglomerate in any conventional manner, for example, by blending the binders, fashioning the mixture into suitable forms and activating at elevated temperatures. Thus, the clay is dried to give a bonded product and the water of hydration of the zeolite is lost. The binders usable in the present invention include any conventional binders, for example, bentonite clays such as bentonite, kaolin clays such as kaolin, plastic ball clays, and clays of attapulgite.

Although there is no specific limitations in the mixing ratio of the crystalline zeolite and the binder, the preferable weight ratio of the crystalline zeolite to the binder is 70:30 to 90:10. The barium-exchanged crystalline zeolite X and the binder and, optionally, some conventional additives, can be mixed together by using any conventional mechanical means such as a muller, kneader, or blender. The mixture is then formed in any conventional manner, for example, by using an extruder, pelletizer, or any other bead-forming means to pellets or other suitable forms. The resultant agglomerates are finally dried and calcined at elevated temperatures (e.g., 150° C. to 300° C. and 550° C. to 700° C., respectively). Thus, the desired zeolitic molecular sieve agglomerate can be obtained. The water of crystallization (i.e., 276 molecule of water pre unit cell) contained in the crystal of the starting Na-X zeolite or the barium-exchanged product thereof is substantially removed to zero during the drying and calcining steps. Thus, the desired molecular sieve agglomerate suitable for use in the drying, adsorption, separation, or removal of a certain gas or other components can be produced.

The molecular sieve agglomerate including the barium-exchanged type crystalline zeolite, in which 60% to 80% of the sodium ions is exchanged with barium ions, can be manufactured by preparing a zeolitic molecular sieve agglomerate including Na-X zeolite and the above-mentioned binder, followed by partially exchanging the sodium ions of the resultant Na-X zeolite agglomerate with barium ions. The Na-X zeolitic molecular sieve agglomerate can be prepared in any conventional manner, e.g., by mixing the Na-X zeolite with the binder, followed by drying and calcining the formed mixture at elevated temperatures (e.g., 150° C. to 300° C. and 550° C. to 700° C., respectively). The resultant Na-X zeolitic molecular sieve agglomerate can be treated with the above-mentioned solution containing barium ions. The resultant barium-exchanged molecular sieve agglomerate is then dried and activated at a temperature of, for example, 200° C. to 550° C.

The molecular sieve agglomerates including, as a main constituent, the barium-exchanged crystalline zeolite having the above-mentioned general formula (I) have excellent thermal stability and thermal deterioration resistance and can be effectively used in the separation and purification of gas mixtures. Especially, the present molecular sieve agglomerates can be advantageously used in the separation of carbon monoxide and nitrogen, in the separation of nitrogen and oxygen, or in the removal of water vapor and carbon dioxide from air containing the same.

The present invention now will be further illustrated by, but is by no means limited to, the following Examples.

EXAMPLE 1

A 100 g amount (dry weight) of Na-X zeolite powder available from UNION SHOWA K.K. was saturated with moisutre in ambient conditions. Then, the Na-X zeolite powder was slurried by adding 250 ml of water. An aqueous solution of 50 g of $BaCl_2 \cdot 2H_2O$ having a purity of 98.5% in 250 ml of water was added to the above prepared slurry. The mixture was then allowed to stand, while occasionally stirring, at room temperature for one night.

The crystal thus obtained was filtered and thoroughly washed with water until no chlorine ions were detected in the washed liquor. After air dried, the crystalline zeolite was heated at a temperature of 200° C. for 2 hours and, then at a temperature of 450° C. for 2 hours. Thus, the crystalline zeolite was activated.

The zeolite crystal thus prepared had a barium content of 21.85% by weight determined by gravimetric analysis and a sodium content of 4.47% by weight determined by atomic-absorption spectroscopic analysis. The barium ion exchange ratio calculated from these analysis data was 62%.

Figure 1:
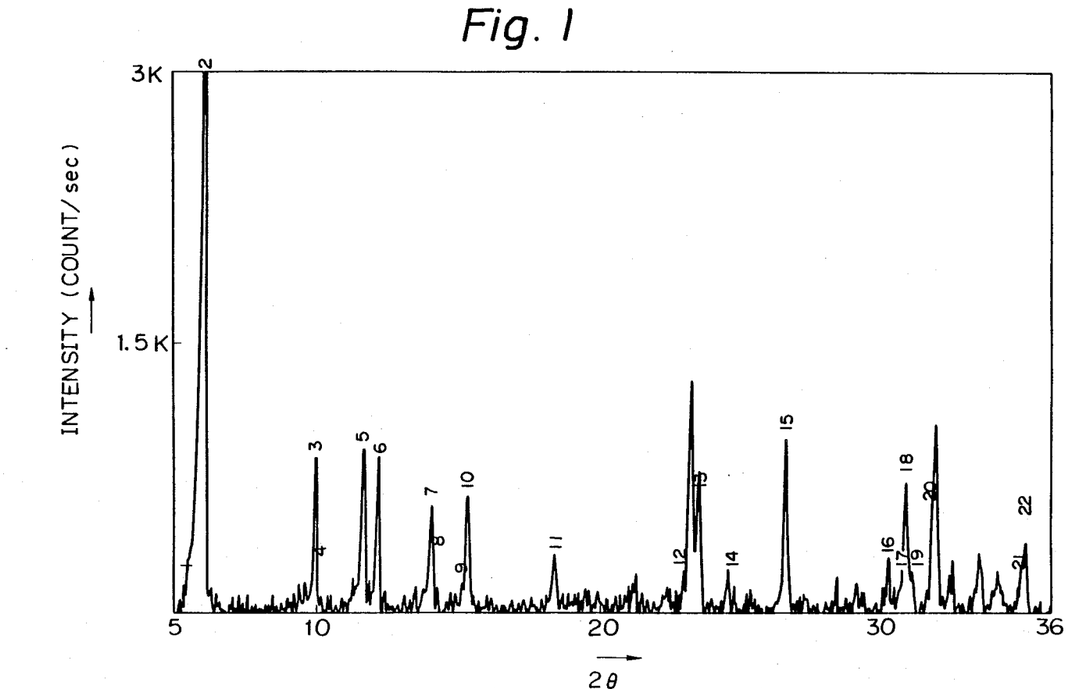
FIG. 1 is an X-ray diffraction pattern of the barium-exchanged crystalline zeolite X obtained in Example 1.
Figure 5:
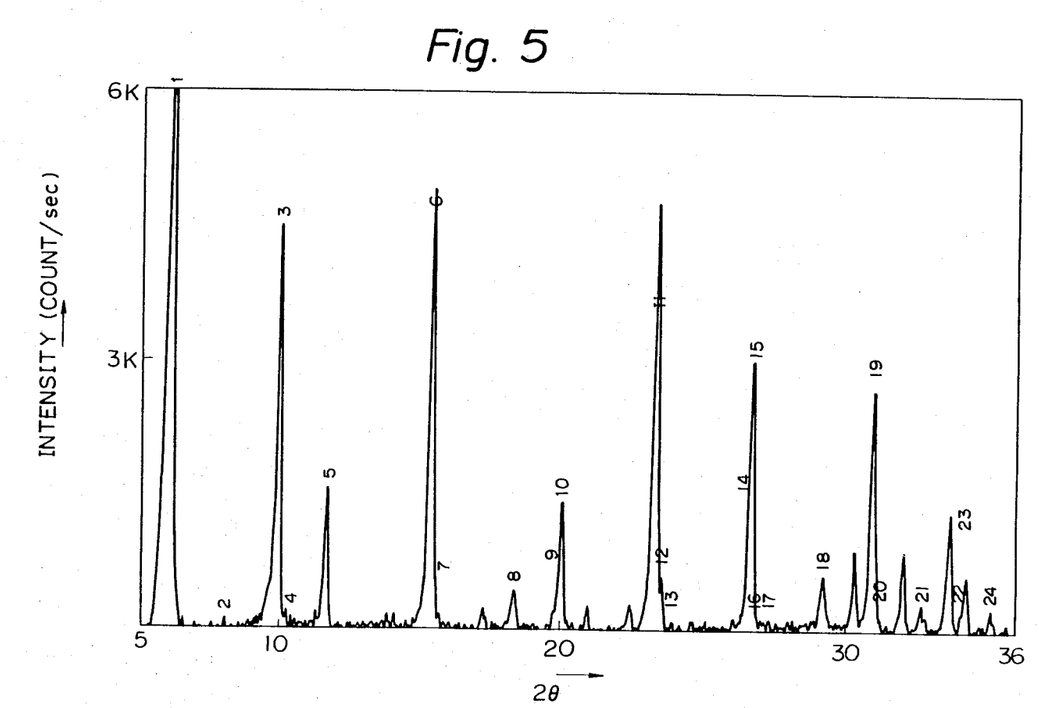
FIG. 5 is an X-ray diffraction pattern of the Na-X zeolite powder used as the starting material in Examples 1 to 4.

The X-ray diffraction pattern of the barium-exchanged crystalline zeolite obtained above was as shown in FIG. 1. The lattice spacings calculated from each peak of FIG. 1 were fundamentally consistent with those of Ba-X disclosed in U.S. Pat. No. 2,882,244, except that there were strong peaks at α=7.57 Å and 3.83 Å, which are strongly observed in the case of Na-X. For comparison, the X-ray diffraction pattern of the starting molecular sieve 13X powder in FIG. 5. The reason why the peak height of the X-ray diffraction pattern in FIG. 1 is lower than that of the molecular sieve 13X powder is that the X-ray absorption coefficient of barium is large.

It is clear from the above data that the sodium ions of the starting Na-X zeolite were partially exchanged with barium ions.

The water absorption capacity of the barium-exchanged crystalline zeolite obtained above was 27.3 g/100 g, as determined under the conditions of 17.5 mmHg and 25° C. in a McBain Bakr apparatus. Although this water adsorption capacity was lower than that of the starting Na-X zeolite powder (i.e., 33.3 g/100 g), this was caused by the fact that the specific gravity of the crystalline zeolite was increased and that the internal void volume of the crystals per unit cell was changed due to the exchange of sodium ion with the barium ion. When the adsorption capacity was compared in terms of the adsorption amount per unit cell, there was no substantial difference between the water adsorption capacities.

EXAMPLE 2

Barium-exchanged crystalline zeolite was prepared in the same manner as in Example 1, except that 60 g of $BaCl_2 \cdot 2H_2O$ was used.

Figure 2:
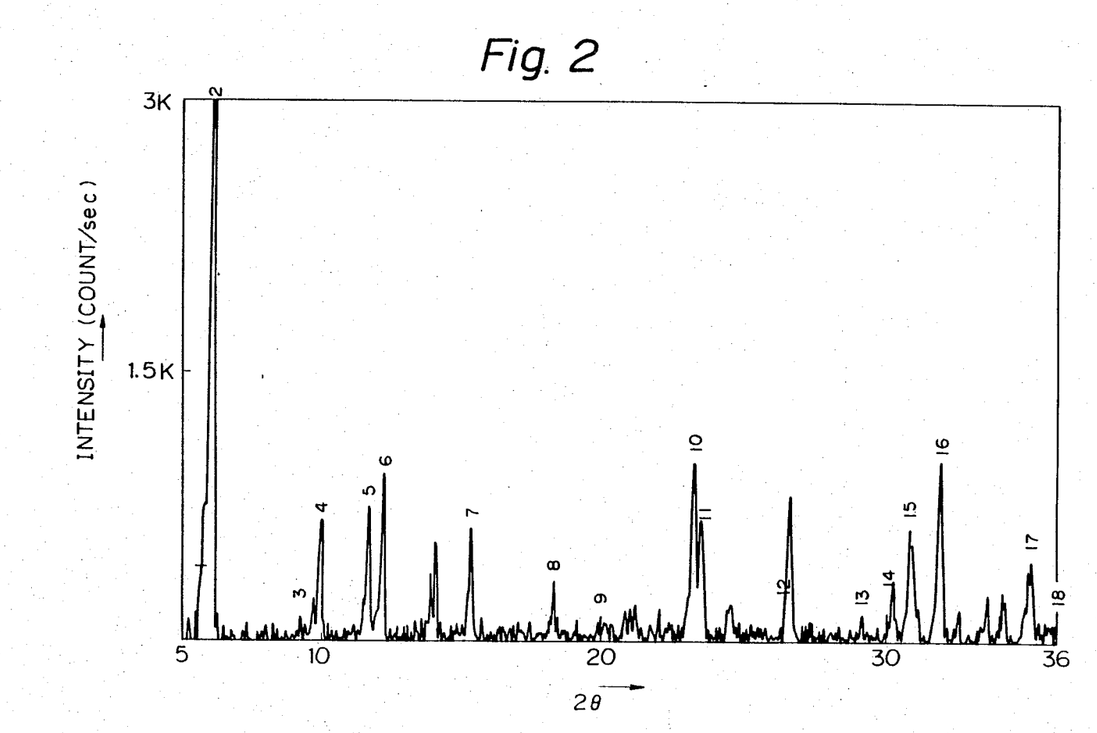
FIG. 2 is an X-ray diffraction pattern of the barium-exchanged crystalline zeolite X obtained in Example 2.

The barium content and the sodium content of the resultant crystalline zeolite determined in the same manner as in Example 1 were 22.79% by weight and 4.04% by weight, respectively. The barium ion exchange ratio obtained from these data was 65%. The X-ray diffraction pattern of the crystalline zeolite obtained above was as shown in FIG. 2.

The water absorption capacity of the crystalline zeolite was 26.9 g/100 g as determined in the same manner as in Example 1.

EXAMPLE 3

Barium-exchanged crystalline zeolite was prepared in the same manner as in Example 1, except that 80 g of $BaCl_2 \cdot 2H_2O$ was used.

Figure 3:
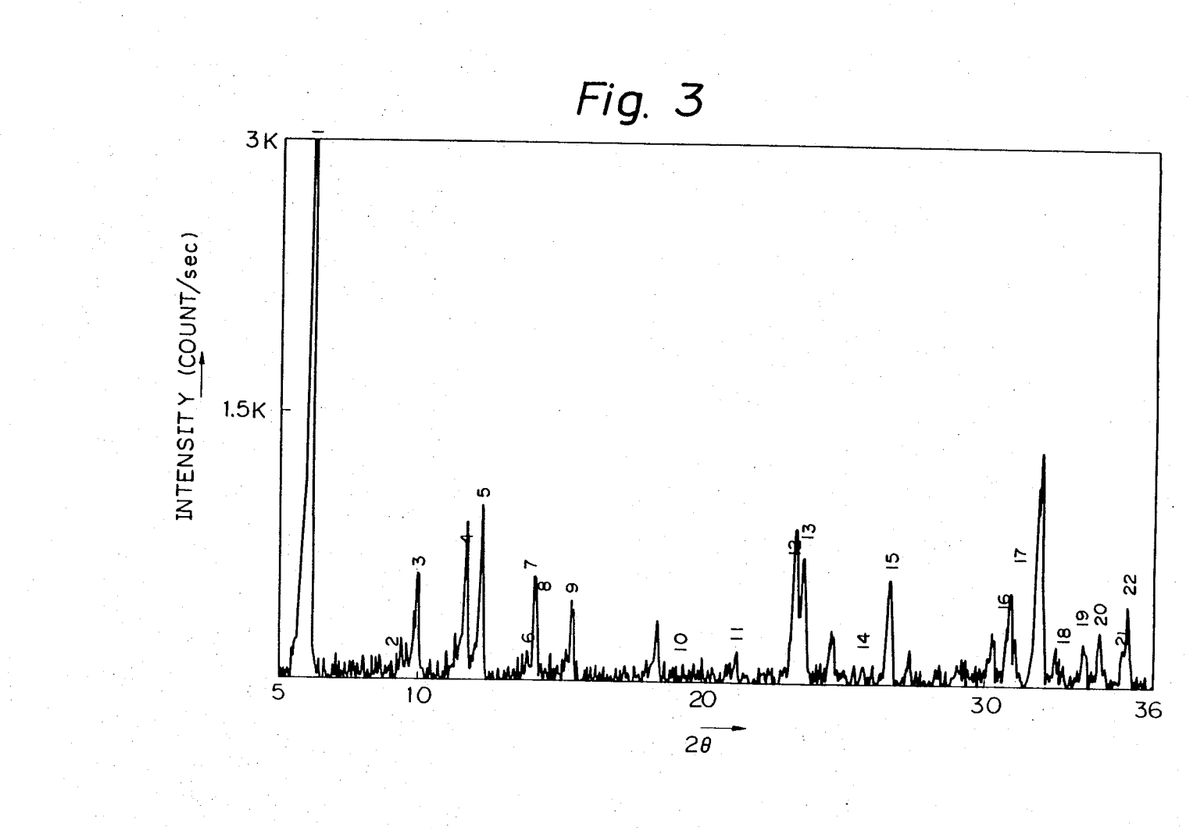
FIG. 3 is an X-ray diffraction pattern of the barium-exchanged crystalline zeolite X obtained in Example 3.

The barium content and the sodium content of the resultant crystalline determined in the same manner as in Example 1 were 25.92% by weight and 2.89% by weight, respectively. The barium ion exchange ratio obtained from these data was 75%. The X-ray diffraction pattern of the crystalline zeolite obtained above was as shown in FIG. 3.

The water adsorption capacity of the crystalline zeolite was 26.6 g/100 g as determined in the same manner as in Example 1.

EXAMPLE 4

Barium-exchange crystalline zeolite was prepared in the same manner as in Example 3, except that the mixture was heated at a temperature of 80° C. for 1 hour after adding the barium solution, instead of being allowed to stand for one night.

Figure 4:
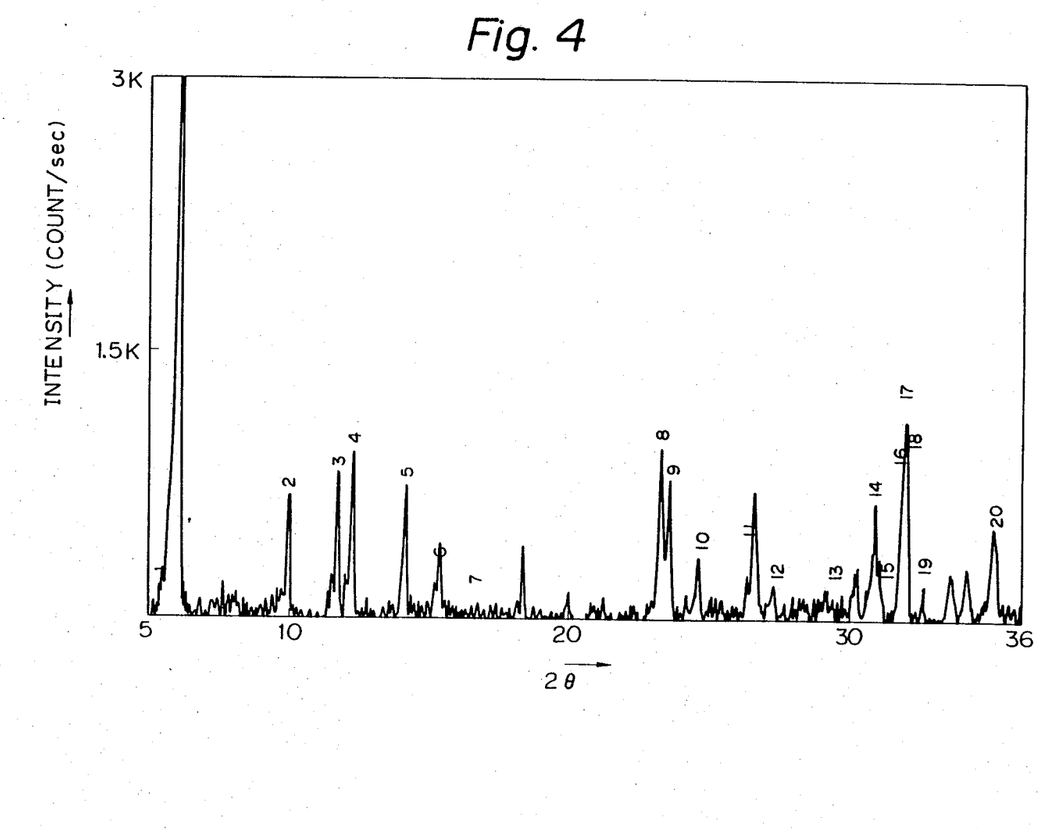
FIG. 4 is an X-ray diffraction pattern of the barium-exchanged crystalline zeolite X obtained in Example 4.

The barium content and the sodium content of the resultant crystalline zeolite determined in the same manner as in Example 1 were 25.62% and 2.95% by weight, respectively. The barium ion exchange ratio obtained from these data was 74%. The X-ray diffraction pattern of the crystalline zeolite obtained above was as shown in FIG. 4.

The water adsorption capacity of the crystalline zeolite was 26.5 g/100 g as determined in the same manner as Example 1.

EXAMPLE 5

A 8 kg amount of barium-exchanged crystalline zeolite X having a barium ion exchange ratio of 66% prepared in the same manner as in Example 2 was saturated with moisture in ambient conditions. The crystalline zeolite thus obtained was mixed with 2 kg of attapulgite by adding 2.7 kg of water. The resultant mixture was extruded through a die and broken into pellets having a diameter of 1.6 mm.

The pellets obtained above were heated at a temperature of 200° C. for 2 hours and were, then, calcined at a temperature of 650° C. for 2 hours for the activation. The pellets thus obtained were crushed to the particles having a size of 60 to 80 meshes in terms of Tyler mesh. The $CO/N_2$ separation capacity of the resultant agglomerate particles was determined by gas chromatography. That is, the separation coefficient defined by a ratio of the retention times of $CO/N_2$ was 3.90, when 1 ml of a gas mixture ($CO/N_2 = \frac{1}{2}$ by volume) was passed through a gas chromatograph column packed with the above-prepared agglomerate particles under the conditions of a column temperature of 40° C. and a feed rate of 30 ml/min with a helium carrier gas and a thermal conductivity detector (TCD). The column diameter was 3 mm and the packed height was 0.5 m.

Furthermore, the water adsorption capacity and the $CO_2$ adsorption capacity of the agglomerate particles determined in the same manner as in Example 1 were 23.6 g/100 g and 17.0 g/100 g, respectively.

EXAMPLE 6

A 8 kg amount of barium-exchanged crystalline zeolite having a barium ion exchange ratio of 77% prepared in the same manner as in Example 3 was agglomerated in the same manner as in Example 5. Thus, the agglomerate particles having a size of 60 to 80 meshes were obtained.

The $CO/N_2$ separation coefficient of the resultant agglomerate particles, determined in the same manner as in Example 5, was 3.75. The water adsorption capacity and the $CO_2$ adsorption capacity of the agglomerate particles, determined in the same manner as in Example 1, were 22.5 g/100 g and 15.9 g/100 g, respectively.

COMPARATIVE EXAMPLE 1

Barium-exchanged crystalline zeolite was prepared in the same manner as in Example 1, except that 25 g of $BaCl_2 \cdot 2H_2O$ was used.

The barium content and the sodium content of the resultant crystalline zeolite determined in the same manner as in Example 1 were 14.7% by weight and 6.2% by weight, respectively. The barium ion exchange ratio obtained from these data was 44%.

The agglomerates of the barium-exchanged Na-X zeolite were prepared in the same manner as in Example 5.

The $CO/N_2$ separation coefficient of the resultant agglomerate particles, determined in the same manner as in Example 5 was 3.53. The water adsorption capacity and the $CO_2$ adsorption capacity of the agglomerate particles, determined in the same manner as in Example 1, were 24.7 g/100 g and 16.9 g/100 g, respectively.

COMPARATIVE EXAMPLE 2

Barium-exchanged crystalline zeolite was prepared in the same manner as in Example 1, except that 200 g of $BaCl_2 \cdot 2H_2O$ was used.

The barium content and the sodium content of the resultant crystalline zeolite determined in the same manner as in Example 1 were 27.9% by weight and 0.7% by weight, respectively. The barium ion exchange ratio obtained from these data was 93%.

The water absorption capacity of the crystalline zeolite was 21.5 g/100 g as determined in the same manner as in Example 1.

EXAMPLE 7

A 2 kg amount of Na-X zeolite in the form of pellets having a diameter of 1.6 mm (available from UNION SHOWA K.K.) was saturated with moisture in ambient conditions. Then, the hydrated pellets were dipped in a solution of 1 kg of $BaCl_2 \cdot 2H_2O$ dissolved in 10 liters of water and were allowed to stand, with occasionally stirring, at room temperature for one night.

The pellets thus obtained was filtered and thoroughly washed with water until no chlorine ions were detected in the washed liquor. After air dried, the pellets were heated at a temperature of 200° C. for 2 hours and, then at a temperature of 450° C. for 2 hours. Thus, the pellets were activated.

The barium content and the sodium content of the resultant pellets determined in the same manner as in Example 1 were 18.8% by weight and 3.6% by weight, respectively. The barium ion exchange ratio obtained from these data was 64%.

The $CO/N_2$ separation coefficient of the resultant pellets, determined in the same manner as in Example 5, was 3.86. The water adsorption capacity and the $CO_2$ absorption capacity of the pellets, determined in the same manner as in Example 1, were 22.7 g/100 g and 15.9 g/100 g, respectively.

EXAMPLE 8

A 1.8 kg amount of the barium-exchanged crystalline zeolite agglomerate particles prepared in Example 6 above was packed into a adsorption column having a nominal diameter of 50 mm and a length of 1100 mm. A gas mixture of air, water vapor, and carbon dioxide ($CO_2$=340 to 440 ppm by volume, $H_2O$=saturated at 25° C., and 5 kg/cm$^2$G) was passed through the column at a flow rate of 3.8 Nm$^3$/hr.

As a result, the $CO_2$ adsorption capacity at the $CO_2$ stoichiometric point was 2.84 g/100 g of zeolite and the mass transfer zone was 23.0% of the total amount of the packed zeolite particles. No breakthrough of the water vapor was observed during the test operation.

EXAMPLE 9

The adsorption test was carried out in the same manner as in Example 8, except that the agglomerate pellets obtained in Example 7 were used.

The $CO_2$ adsorption capacity at the $CO_2$ stoichiometric point was 2.8 g/100 g of the zeolite and the mass transfer zone was 23.3% of the total amount of the packed zeolite pellets. No breakthrough of the water vapor was observed during the test operation.

COMPARATIVE EXAMPLE 3

The adsorption test was carried out in the same manner as in Example 8, except that Na-X zeolite commercially available from UNION SHOWA K.K. were used.

The $CO_2$ adsorption capacity at the $CO_2$ stoichiometric point was 2.5 g/100 g of the zeolite and the mass tranfer zone was 28% of the total amount of the packed zeolite pellets. No breakthrough of the water vapor was observed during the test operation.

EXAMPLE 10

The barium-exchanged molecular sieve 13X pellets having a barium exchange ratio of 78% obtained in the same manner as in Example 7, were packed into a gas chromatography column having a nominal diameter of 3 mm. The packed height was 500 mm.

Figure 6:
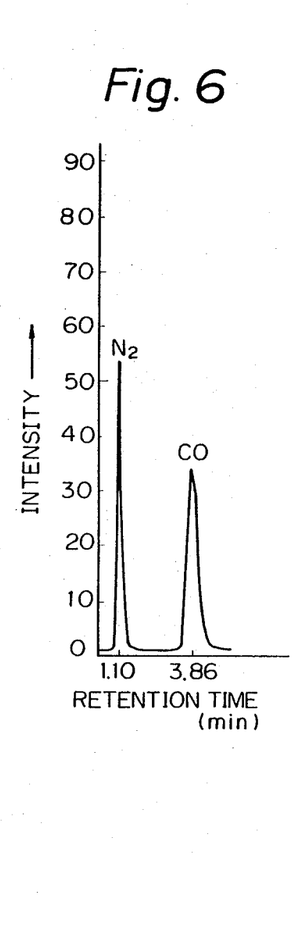
FIG. 6 is a chromatogram obtained in Example 10.

A gas mixture of carbon monoxide and nitrogen (i.e., $CO/N_2 = \frac{1}{2}$ by volume) was passed through the column under a pressure of 0.6 to 0.7 kg/cm$^2$G. The resultant chromatogram was as shown in FIG. 6.

COMPARATIVE EXAMPLE 4

The separation test of carbon monoxide and nitrogen was carried out in the same manner as in Example 10, except that the commercially available Na-X zeolite was packed in the column.

Figure 7:
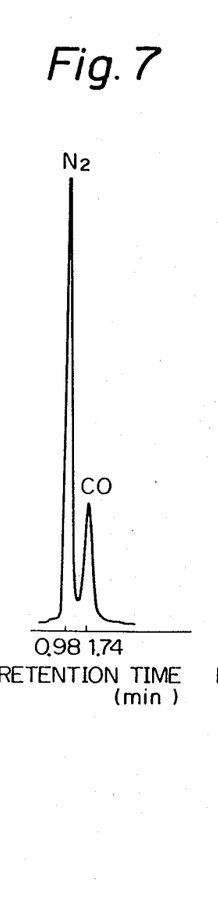
FIG. 7 is a chromatogram obtained in Comparative Example 4.

The resultant chromatogram was shown in FIG. 7.

EXAMPLE 11

The separation test of nitrogen and oxygen from air was carried out in the same manner as in Example 10, except that the zeolite particles X having a barium exchange ratio of 65% and air were used as the adsorbent and the gas mixture, respectively.

Figure 8:
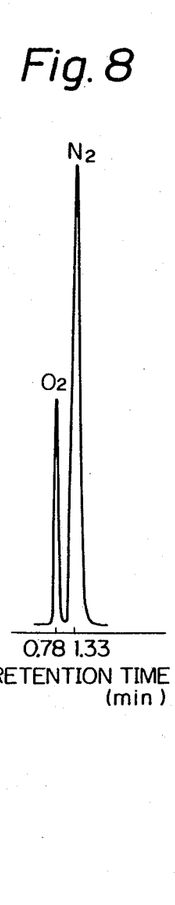
FIG. 8 is a chromatogram obtained in Example 11.

The resultant chromotogram was as shown in FIG. 8.

COMPARATIVE EXAMPLE 5

The separation test of Comparative Example 4 was repeated, except that the air was used as a gas mixture.

Figure 9:
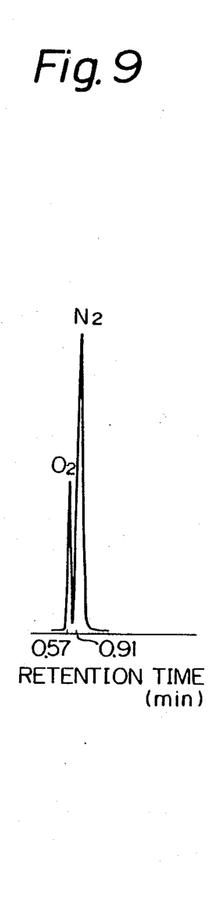
FIG. 9 is a chromatogram obtained in Comparative Example 5.

The resultant chromatogram was as shown in FIG. 9.

We claim:

1. A process for separating carbon monoxide from a fluid containing carbon monoxide and nitrogen comprising treating the fluid with a zeolitic molecular sieve agglomerate comprising a bonded product of a crystalline zeolite and a binder, said crystalline zeolite having, except for water of crystallization, the formula:

$$Ba_{43x}Na_{86(1-x)}[(AlO_2)_{86}(SiO_2)_{106}] \qquad (I)$$

wherein x is numbered from 0.6 to 0.8.

2. A process as claimed in claim 1, wherein the weight ratio of the crystalline zeolite to the binder is 70:30 to 90:10.

3. A process as claimed in claim 1, wherein x is 0.64 to 0.78.

4. A process as claimed in claim 1, wherein x is a number from 0.66 to 0.77.

5. A process as claimed in claim 1, wherein the agglomerate comprises particles having a size of 60 to 80 meshes.

6. A process as claimed in claim 1, wherein the carbon monoxide/nitrogen separation coefficient is in the range of about 3.75 to about 3.90.

7. A process as claimed in claim 1, wherein the nitrogen retention time is about 1.10 and the carbon monoxide retention time is about 3.86.